No. 720,617. PATENTED FEB. 17, 1903.
M. C. RATCLIFF.
BREAD, MEAT, OR VEGETABLE SLICER.
APPLICATION FILED JUNE 14, 1902.
NO MODEL.
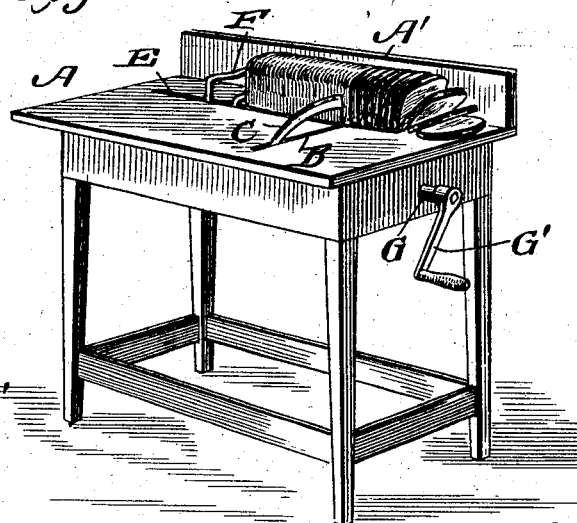
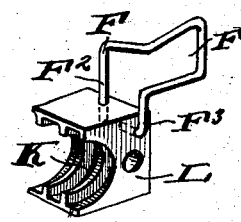
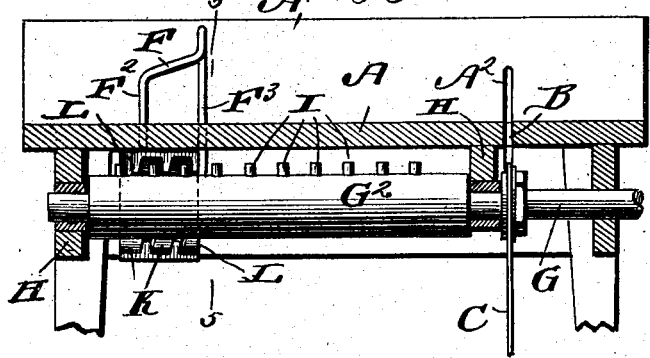
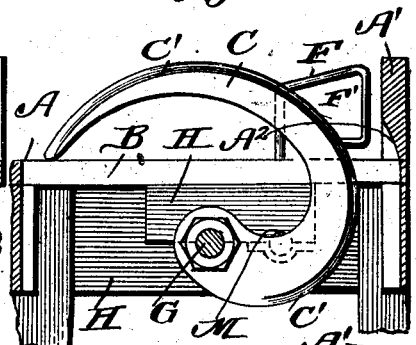
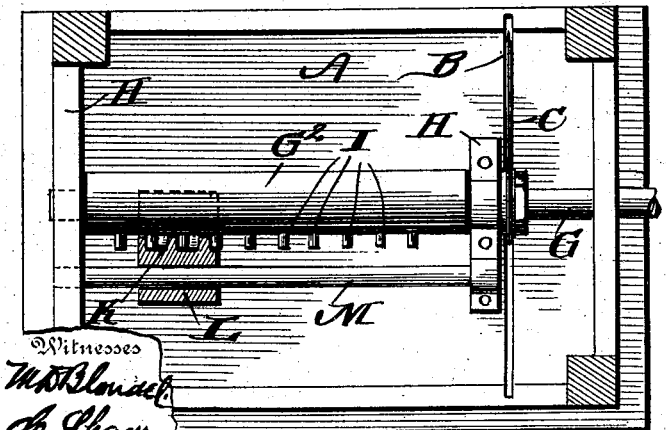
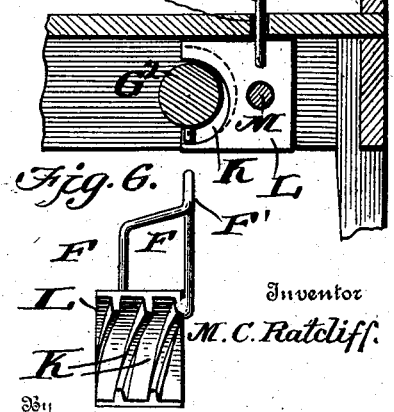
Witnesses
Inventor
M. C. Ratcliff.
By
Attorneys

UNITED STATES PATENT OFFICE.

MOSES C. RATCLIFF, OF MUNCIE, INDIANA.

BREAD, MEAT, OR VEGETABLE SLICER.

SPECIFICATION forming part of Letters Patent No. 720,617, dated February 17, 1903.

Application filed June 14, 1902. Serial No. 111,673. (No model.)

*To all whom it may concern:*

Be it known that I, MOSES C. RATCLIFF, a citizen of the United States, residing at Muncie, in the county of Delaware and State of Indiana, have invented a new and useful Bread, Meat, or Vegetable Slicer, of which the following is a specification.

This invention is an improved construction of slicing-machine particularly adapted for slicing bread, meat, vegetables, and similar material.

The object of the invention is to provide an exceedingly cheap, simple, and efficient construction and one in which the follower can be quickly and easily reversed whenever desired.

With these objects in view the invention consists in the novel features of construction, combination, and arrangement, all of which will be fully described hereinafter and pointed out in the claims.

In the drawings forming part of this specification, Figure 1 is a perspective view of my invention applied to a table. Fig. 2 is a longitudinal sectional view taken through the table, the feed-shaft and block being shown in elevation. Fig. 3 is a transverse section taken through the table, showing the knife in elevation. Fig. 4 is an inverted plan view. Fig. 5 is a detail section taken on the line 5 5 of Fig. 2. Fig. 6 is a detail face view of the follower-block and arm connected thereto. Fig. 7 is a detail perspective view of the said block and arm.

Referring to the drawings, A indicates an ordinary table having a board A' arranged at one edge thereof. This table is slotted transversely, as shown at B, to permit the movement of the rotary knife C, and the table is also slotted longitudinally, as shown at E, to permit the movement of the feeding-arm F, which forces the bread or other article toward the cutting-knife.

In order to operate the cutting-knife and also the feed-arm, I employ a shaft G, which is journaled beneath the table and provided with a suitable crank G' at the forward end. The cutting-blade C is rigidly secured to the said shaft and works through the transverse slot B, said cutting-blade being preferably cam-shaped, as shown, the edge C' being sharpened, so that with each rotation of the shaft G the rotary cutting-blade C will be given a complete rotation, and owing to its peculiar cam shape the cutting edge will be forced entirely through the loaf of bread or other article to be sliced. If necessary, the board A' may be slotted, as shown at A², in order to permit a complete rotation of the knife and also permit the blade to completely sever the slice. The shaft G is enlarged, as shown at G², between the transverse strips H, or the said shaft may be provided with a separate drum between these strips, if so desired; but for the sake of cheapness I prefer to make the drum portion G² and the shaft proper G of one piece, and by arranging the drum portion G² between the strips H the shaft is permitted to rotate and at the same time is held against longitudinal movement. The drum portion G² is provided with a series of pins or studs I, arranged at regular intervals and in alinement with each other, said pins or studs being adapted to engage the threads K, cut into the block L, sliding upon the rod M, arranged parallel to the drum portion G² and between the transverse strips H. This block L has the feeding-arm F rigidly connected thereto, said arm F being preferably constructed of wire and bent to provide an essentially rectangular-shaped frame F', the ends F² and F³ of the wire being connected to the block L in longitudinal alinement, so that the said ends of the wire will slide in the longitudinal slot E as the feed-drum is moved forwardly through the medium of the follower-block L, which is actuated through the medium of the drum carrying the studs or pins which engage the threads cut in the curved face of the block L.

It will thus be understood that in order to slice a loaf of bread, piece of meat, or other article said article is placed upon the table and the feeding-arm pressed against the rear thereof. The crank is then operated to rotate the cutter-blade, and the article will be cut into a series of thin slices, each rotation of the crank serving to cut a slice, and at each rotation of the shaft the feed-arm is fed forwardly the distance of one pin or stud. These operations are continued until the entire loaf is sliced. When it is desired to reverse the feeding-arm and return it to its rearmost position, it is only necessary to give the crank a partial rotation, so as to move the pins or studs out of engagement with the threaded block. The block can then be slid back and the device is ready for operation again.

It will thus be seen that I provide an exceedingly cheap, simple, and efficient construction of slicer, capable of quick and easy manipulation, either for the purpose of cutting the slice or for the purpose of returning the parts to their normal positions ready to begin on another article.

Having thus fully described my invention, what I claim as new, and desire to secure by Letters Patent, is—

1. The combination with a table having a slotted top, a shaft journaled beneath the table, a rotatable knife carried by the shaft, a movable follower-block adapted to travel parallel to the shaft and having threads formed on its adjacent face, studs carried by the shaft and adapted to engage the threads on the follower-block during a portion only of each revolution of the shaft, a feeding-arm attached to said block said arm being adapted to be moved to the starting position when the studs are out of engagement with the follower-block and to have a step-by-step motion toward the knife when the shaft is rotated, and means for rotating the shaft.

2. The combination with the table slotted longitudinally and transversely, of a rotary shaft journaled longitudinally beneath the table, a cam-shaped cutting-blade rigidly mounted upon said shaft and adapted to work in the transverse slot, a drum portion arranged upon the shaft and having a series of pins or studs projecting therefrom, the feed-block arranged adjacent to the drum portion of the shaft and having a curved face adapted to partially embrace the drum portion, said curved face having threads cut therein, said threads being adapted for engagement with the pins or studs, the longitudinal guide-rod, the feed-arm formed of wire, the ends thereof passing through the longitudinal slot and attached to the follower-block, substantially as described.

MOSES C. RATCLIFF.

Witnesses:
BERT CALVERT,
HOMER HIGMAN.